United States Patent [19]
Fruehan

[11] 3,930,843
[45] Jan. 6, 1976

[54] METHOD FOR INCREASING METALLIC YIELD IN BOTTOM BLOWN PROCESSES

[75] Inventor: Richard J. Fruehan, Franklin Township, Allegheny County, Pa.

[73] Assignee: United States Steel Corporation, Pittsburgh, Pa.

[22] Filed: Aug. 30, 1974

[21] Appl. No.: 501,915

[52] U.S. Cl. .................................. 75/60; 75/59
[51] Int. Cl.² ........................................ C21C 5/34
[58] Field of Search ............................... 75/59, 60

[56] References Cited
UNITED STATES PATENTS

| | | | |
|---|---|---|---|
| 3,046,107 | 7/1962 | Nelson | 75/60 |
| 3,706,549 | 12/1972 | Knuppel | 75/60 |
| 3,725,041 | 4/1973 | Ramachandran | 75/60 |

*Primary Examiner*—Peter D. Rosenberg
*Attorney, Agent, or Firm*—Arthur J. Greif

[57] ABSTRACT

In the Q-BOP process for the production of low carbon steels (eg. 0.02 – 0.05% C), inert gas-oxygen mixtures are employed during the latter part of the blow, i.e. when the C content of the melt reaches a level of about 0.25%. As such lower carbon contents, the rate of decarburization is not decreased by dilution of the oxygen with inert gas. However, such dilution results in less $O_2$ being available for oxidation of iron, hence significant increases in metallic yield may be achieved. By precise control of the $O_2$/inert gas ratio, increases in metallic yield in excess of 2% are achieved.

8 Claims, 1 Drawing Figure

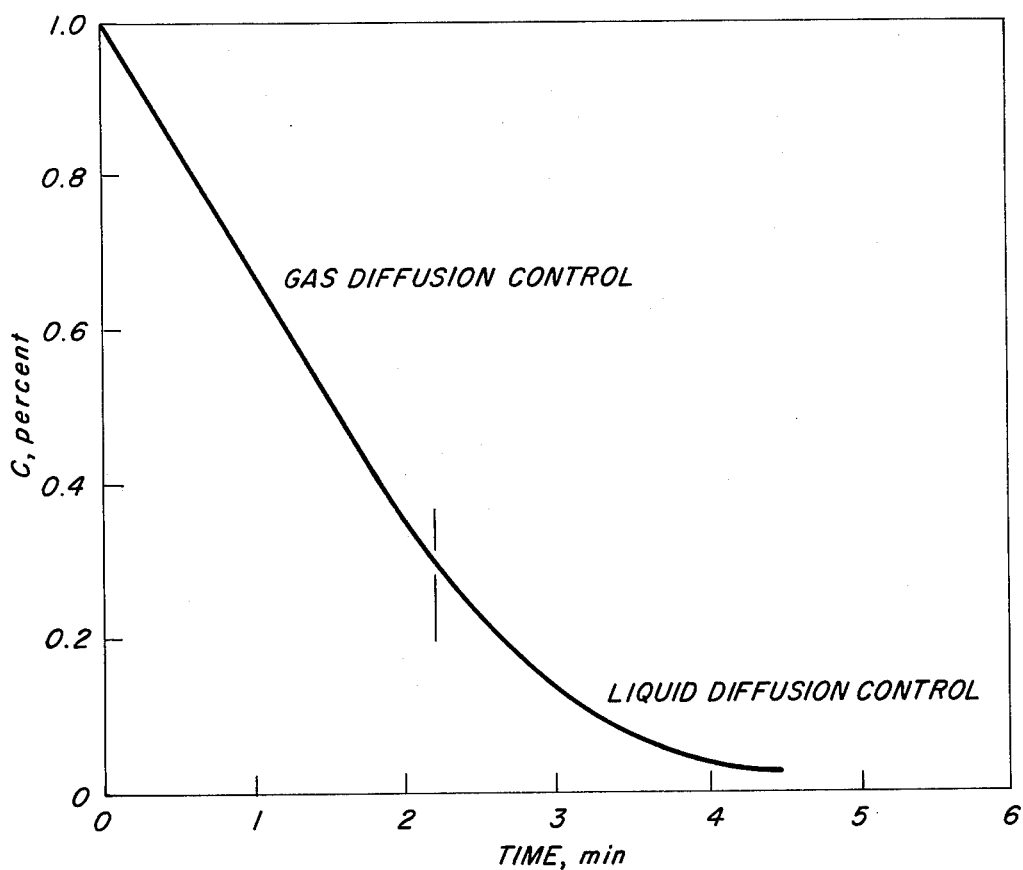

METHOD FOR INCREASING METALLIC YIELD IN BOTTOM BLOWN PROCESSES

This invention relates to the refining of pig iron, by the pneumatic steelmaking process known as Q-BOP. More particularly, this invention is directed to a method for significantly enhancing the metallic yield, when such Q-BOP is employed for decreasing the carbon content to a level below 0.08 percent.

In the most widely employed pneumatic steelmaking process, the Basic Oxygen Process, oxygen is blown from above, through a lance, so as to pierce through the overlying slag layer and penetrate into the iron melt. In the Q-BOP Process, the oxygen is blown from below the melt, through tuyeres located in or near the bottom of the converter. A protective gas, generally a hydrocarbon, is employed to encase or surround the oxygen stream in order to decrease the inordinately high wear at both the tuyeres and the converter bottom. One of the significant advantages of the latter process over the former, is its consistent ability to achieve enhanced metallic yields, generally of the order of 1.5 to 2.0 percent higher. Such higher yields in the Q-BOP are achieved primarily because (i) the more intensive mixing by the oxygen jet provides a closer approach to equilibrium conditions, thereby resulting in significantly lower contents of iron oxide in the slag and (ii) the significantly decreased amount of brown smoke (iron oxide fume) resulting from bottom blowing. As a result thereof, metallic yields of 91 or 92% are readily achievable. Notwithstanding such improved yield, it would nevertheless be desirable if even further increases in yield could be achieved. Thus, for example, in a 200-ton heat, an increase in yield of even 1% would provide an extra 4000 lbs. of unoxidized, recovered hot metal.

It is therefore the principal object of this invention to provide a method for further increasing the yield achievable in Q-BOP steelmaking.

This and other objects and advantages of the instant invention will be more apparent from the following description and claims, when taken in conjunction with;

The FIGURE, which is graph depicting the rate of decarburization for the latter portion of a 30-ton Q-BOP heat.

The term pig iron is most commonly employed to describe the metallic product of the blast furnace when it contains in excess of about 90 percent iron. However, pig iron can be produced by means other than that of the blast furnace. The instant method may be employed in the refining of all such pig irons. Thus, in its broadest sense, this invention is applicable to the refining of any molten iron product containing carbon in excess of about one percent, wherein it is desired to remove said carbon to a level below 0.08 percent (and any chromium, if present, to a level below 0.5 percent). In the Q-BOP process, as well as other similar pneumatic steelmaking processes, wherein an oxygen containing gas is blown through tuyeres located in or near the bottom of the vessel, many of the steelmaking reactions are those which occur at the interface between gas bubbles and the molten steel. Because of the resulting large gas bubble-liquid metal surface area and the high liquid mass transfer rates, these processes generally permit relatively rapid gas-metal reactions. One such rapid reaction is that of the oxygen in the gas bubble with the carbon in the molten bath, to form CO and $CO_2$. From an analysis of plant data and by comparing such data with the results of laboratory experiments, it was concluded that the rate of oxidation of carbon, at high carbon levels (i.e. >0.3%-see the FIGURE) is controlled by gas phase mass transfer within the gas bubbles. Stated another way, as the gas bubbles rise in the melt, the rate of carbon oxidation is controlled, at such high carbon levels, by diffusion of $O_2$ and/or $CO_2$ in the gas bubble to the gas-metal surface of the bubble and CO away from said surface. Gas phase mass transfer is relatively fast, consequently there will essentially be complete utilization of the oxygen for decarburization. In this case, the overall reaction may be represented by:

$\underline{C}$ (in Fe) + ½ $O_2$ → CO (gas)

The rate of decarburization will be independent of time and given by $$\frac{d(\%C)}{dt} = -k_1$$

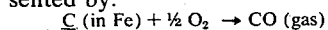

where $k_1$ is an operational parameter which depends principally on gas flow rate and the metallic charge. However, it further was found that at carbon levels below about 0.25 percent (see the FIGURE) there is a change in the rate controlling mechanism to liquid phase mass transfer. Thus, at such low carbon levels the rate of decarburization is now controlled by diffusion of carbon from the bulk metal to the bubble surface. In the latter case, the rate equation is given by $$\ln \frac{[\%C_t]}{[\%C_o]} = -k_2 t$$

where $k_2$ is an operational constant depending on, for example, gas flow rate, metallic charge and the mass transfer coefficient, $C_t$ is the carbon content at time $t$ and $C_o$ is the carbon level at $t = 0$. As a result thereof, not all of the oxygen blown is utilized in the oxidation of carbon, since the rate is now controlled by the significantly slower mass transfer in the metal. When making a low-carbon steel, such excess oxygen oxidizes iron and results in lower metallic yield. It should be noted that at all carbon levels iron may initially be oxidized at the gas bubble-liquid metal surface. However, at high carbon contents the mass transfer of carbon to the surface is fast enough to reduce the iron oxide before the gas leaves the bath. At low carbon contents the rate of transfer of carbon to the surface is insufficient to reduce all the iron oxide. It may therefore be seen, that during this latter period, if such excess of oxygen is either decreased or totally eliminated, then it will no longer be available for oxidation of iron, thereby increasing metallic yield. However, if the $O_2$ throughput is simply decreased, without compensating for such decrease, then the total rate of gas introduction will decrease concomitantly. Such decrease in the total rate of gas introduction will result in a decrease in the surface area (bubble area) available for decarburization thereby merely lengthening the time required to achieve the desired final decarburization, and consequently the time available for Fe oxidation, as well. Thus, the desired enhancement of metallic yield will not be achieved. On the other hand, if the rate of $O_2$ throughput is materially decreased, while the total gas throughput is not substantially different from that initially employed; then the surface area available for decarburization will not be decreased significantly. Consequently, the period of time required for final decarburization will likewise not be decreased, and the metallic yield will thereby be enhanced. When the $O_2$ throughput is materially reduced, the total gas throughput may be maintained approximately constant (i.e. not deviate by more than about 20%) by the addition of a non-deleterious gas. The term non-deleterious gas, as employed herein, is any gas, depending on the desired end product, that does not react appreciably to form undesirable reaction products. For example, any of the "inert" or "noble" gases may be employed. Similarly, in those cases where a higher nitrogen content in the final product is either desirable or of no consequence, then less expensive $N_2$ may be employed. In a similar manner, $H_2$, natural gas or other of the well known protective gases commonly employed in Q-BOP processes may be employed. In the main, however, argon will most often be employed to effect such approximately constant total gas throughput. It should be understood, however, that argon or such other non-deleterious gases are employed herein solely for maintaining total gas throughput and not for effecting a change in equilibrium, as in the well-known process for the production of stainless steel (commonly known as the AOD process e.g. U.S. Pat. No. 3,046,107) in which similar gases are employed for effecting such change in the equilibrium, by decreasing the partial pressure of the CO.

The particular features and basis for the instant method will be better appreciated by comparison with the aforementioned AOD process. In the latter process, relating to the production of high chromium steel, the basic oxidation reaction can be defined as:
  (I)  $Cr_2O_3 + 3C(\text{in Fe}) \rightleftharpoons 2Cr(\text{in Fe}) + 3CO(\text{gas})$
thus, the equilibrium constant will be:

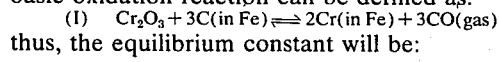

$$K = \frac{\alpha_{Cr}^2 \cdot P_{CO}^3}{\alpha_C^3}$$

Therefore, if the carbon is to be removed (by oxidation) from the liquid metal without seriously oxidizing the Cr, it is seen that reaction in the forward direction must be thermodynamically favorable, i.e. the free energy must be negative. For most commercial stainless steels, the ratio of $\alpha^2_{Cr}:\alpha^3_C$ (under normal conditions wherein the partial pressure of CO=1 atmosphere) will not be favorable at low C contents for the reaction to go in the forward direction (i.e. $\Delta F$ will be positive). For example, under such normal conditions of $P_{CO}=1$ atm, the critical C content for a melt containing 18% C, at a temperature of 1600°C, will be about 0.4%. Thus, Cr will be seriously oxidized if it is attempted to decrease C below the 0.4% level. The free energy could be made more favorable by increasing the melt temperature. However this expedient will undesirably increase refractory wear. A second expedient for shifting the equilibrium constant would be to reduce the partial pressure of CO. This, could be accomplished (i) by pulling a vacuum over the system or (ii) as in the AOD process, by dilution of the CO formed, through the use of argon-oxygen mixtures. Thus, under the foregoing conditions, if the $P_{CO}$ were reduced from 1.0 to 0.2 atmospheres, then it would theoretically be possible to decarburize said 18% Cr steel to about 0.08% C without appreciable Cr oxidation.

By contrast, in the instant process directed to refining of pig iron, the oxidation of the principal constituents may be described by:
  (II)  $FeO + C(\text{in Fe}) \rightleftharpoons CO(\text{gas}) + Fe$

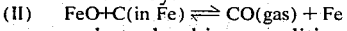

Under normal steelmaking conditions the forward direction will always be thermodynamically favorable. Any Cr which may be present as an incidental impurity will already be at such a low level that reaction (I) will essentially always be favorable for C oxidation. Therefore, the reduction of the partial pressure of CO would be expected to have virtually no effect on the forward reaction (i.e. the amount of FeO being reduced by C). In this case, the argon or other non-deleterious gas is not employed to reduce $P_{CO}$, but to merely supply sufficient gas throughput to maintain approximately the same surface area available for chemical reaction.

The basic Q-BOP process comprises introducing a stream of generally commercially pure oxygen into the melt through tuyeres located in or near the converter bottom. The use of oxygen of such purity, as in the conventional Bessemer process, would normally result in extremely rapid wear of both the tuyeres and the converter bottom. Therefore, the oxygen stream is surrounded by an encasing or coolant gas to slow down the violent reaction and thereby achieve substantially reduced wear. In actual practice the ratio of oxygen to encasing case is held within a critical range so as to permit such wear to proceed in a slow and controlled manner.

The two procedures described below, are exemplary of the instant invention, wherein the basic Q-BOP process is modified by introducing the oxygen at a generally decreasing rate, subsequent to the time the C content of the melt reaches a level of 0.25 percent. Both examples are for 200 ton heats, wherein an initial blowing rate of 26,000 NCF/min. of oxygen is employed. Methane is employed as the protective gas at a flow rate equal to 10% of the oxygen rate. Thus, for the bulk of the blow, i.e. the initial period wherein decarburization is under gas diffusion control, a methane rate of 2,600 NCF/min. is employed. However, as the $O_2$ rate is decreased after reaching a carbon level of 0.25%; the methane rate is correspondingly decreased to maintain the above noted ratio of 1:10. It should be noted in both of the examples below; that as a result of the fact that less iron is being oxidized, less heat is generated, resulting in a decrease in scrap melting capacity. Thus, in order to obtain approximately the same tap temperatures as in normal practice (i.e. in which the $O_2$ rate is substantially constant throughout the blow), scrap additions are decreased by about one ton.

Example 1

At a carbon content of about 0.25%, the $O_2$ rate is decreased to 13,000 NCF/min., but the total blowing rate is maintained close to the total initial rate by blowing 13,000 NCF/min. of Ar together with 1300 NCF/min. of methane. Utilizing this $O_2$/Ar ratio of 1/1, the carbon content is decreased to about 0.04% after a time of approximately 1.3 minutes. At this point, 100% Ar is blown for an additional 0.5 minutes. In this latter period, where $O_2$ is completely shut-off and only Ar is blown, the oxygen already present in the metal is utilized for decarburization and in this case is sufficient to reduce the carbon content to 0.025%. As a result of this practice only about 1000 lbs. of iron are oxidized, compared to that resulting from normal practice, wherein an average of 9,000 lbs. are oxidized, i.e. an increase in yield of about 2%.

Example 2

In this example, the yield is further increased to a small extent by changing $O_2/Ar$ ratio at an intermediate carbon level. After reaching 0.25% C, the $O_2/Ar$ ratio of 1/1 is employed for slightly under 0.9 minutes. The $O_2/Ar$ ratio is then decreased to about ½ (i.e., 9,000 NCF/min $O_2$, 17,000 NCF/min. Ar, and 900 NCF/min. $O_2$) for an additional blowing period of 0.5 min. and then, as in Ex. 1, finished with 100% Ar for a further 0.5 minutes. Only slightly more than 200 lbs. of iron are oxidized for an increase in yield of almost 2.2%.

From the above, it may be seen that during the initial blowing period there are basically two different gas throughput rates which are of concern; $R_o$ the rate at which $O_2$ is introduced, and $R_p$ the rate at which protective gases (eg. methane) are introduced. $R_o$ will, in general, vary from a minimum rate of 75 NCF/min. per ton of steel to a maximum rate of about 150 NCF/min. per ton of steel being refined. The minimum rate is dictated by need to maintain sufficient back pressure in the tuyeres, thereby preventing molten metal from plugging the tuyere openings. Although rates higher than the above noted maximum would be desirable for shortening the length of the blow (and thereby increasing production capability), it has been found that rates significantly higher than 150 NCF/min.ton result in undesirable splashing and spitting above the converter. As shown in U.S. Pat. No. 3,706,549, the disclosure of which is incorporated herein by reference, $R_o >> R_p$. Thus, we may define the average total rate $R_T$, as the sum of $R_o + R_p$. It should be noted that $R_T$ is not necessarily constant, but merely the average total rate of gas introduction for the initial blowing period, i.e. the period when decarburization is under gaseous diffusion control (the upper portion of the curve). Thereafter, by introducing oxygen at a generally decreasing rate at a point when the rate of decarburization is controlled by mass transfer in the metal (i.e. the lower portion of the curve in the FIGURE), very significant increases in metallic yield may be achieved. While maximum yield could be achieved by a constantly decreasing optimized $O_2$ throughput (i.e. a continuous curve), such practice will not be warranted in most cases; because of the added control complications, the additional argon required and only the very slight increase in yield achievable in comparison to the more simplified practice of Ex. 1, or even Ex. 2. Thus, while such a constantly decreasing $O_2$ throughput is clearly within the purview of this invention; in its broader sense, materially increased metallic yields may be achieved by utilizing a generally decreasing $O_2$ throughput, in the prescribed period, while maintaining the total gas rate at a level not substantially different from $R_T$. A generally decreasing $O_2$ rate may be defined as any throughput, the overall curve of which exhibits an average negative slope. Additionally, said generally decreasing $O_2$ rate should fall within the bounds prescribed in the following defined periods of decarburization;

i. in the decarburization period wherein C decreases from 0.25 to 0.18%, the average $O_2$ throughput rate should be between 0.4 $R_o$ to 1.0 $R_o$, and preferably between 0.4 to 0.8 $R_o$, ii. in the decarburization period when C decreases from 0.18% to 0.09%, the average $O_2$ throughput rate should be between 0.3 $R_o$ to 0.8 $R_o$, and preferably less than 0.7 $R_o$, and iii. in the decarburization period when C decreases from 0.09% to the finally desired level (said final level being less than 0.08% C and generally between 0.05 to 0.02% C) an average $O_2$ rate of from zero to 0.5 $R_o$, and preferably less than 0.3 $R_o$.

I claim:

1. In the bottom blown process for the refining of molten pig iron, which comprises introducing an oxygen containing gas therein to decrease the impurity content thereof and produce a final molten steel product containing, C ... 0.08 max.

balance Fe, and incidental steelmaking residual elements, said gas being introduced during the initial blowing period, at an average total rate $R_T$, said total rate $R_T$ being the sum of $R_o$, the rate at which $O_2$ is introduced and $R_p$, the rate at which protective gasses are introduced, and wherein $R_o >> R_p$, the improvement, subsequent to the time the C content of said melt is decreased to a level of 0.25%, which comprises introducing said $O_2$ at a generally decreasing rate, while maintaining the total gas input at a level not substantially different from $R_T$ by the introduction therein of a non-deleterious gas, said generally decreasing $O_2$ rate being achieved by introducing $O_2$ at an average rate within the range prescribed in the following periods;

i. the period wherein C decreases from 0.25 to 0.18%, at an average rate of from 0.4 $R_o$ to 1.0 $R_o$ ii. the period wherein C decreases from 0.18 to 0.09%, at an average rate of from 0.3 $R_o$ to 0.8 $R_o$ iii. the period wherein C decreases from 0.09% to the final level, at an average rate of from zero to 0.5 $R_o$.

2. The method of claim 1, wherein the $O_2$ is introduced during period (iii) at an average rate less than 0.3 $R_o$.

3. The method of claim 2, wherein the level of C in the final molten steel product is 0.02 to 0.05 percent.

4. The method of claim 3, wherein said non-deleterious gas is argon.

5. The method of claim 2, wherein the $O_2$ is introduced during period (ii) at an average rate within the range 0.3 $R_o$ to 0.7 $R_o$.

6. The method of claim 4, wherein the average $O_2$ rate for period (i) is less than 0.8 $R_o$.

7. The method of claim 6, wherein the level of C in the final molten steel product is 0.02 to 0.05 percent.

8. The method of claim 7, wherein said non-deleterious gas is argon.

* * * * *